United States Patent
Wu et al.

(10) Patent No.: US 7,539,791 B2
(45) Date of Patent: May 26, 2009

(54) METHOD AND APPARATUS FOR OPTIMIZING DATA BUFFERING

(75) Inventors: Sung-Yang Wu, Tai-Chung Hsien (TW); Ping-Tsai Tsai, Kao-Hsiung (TW); Pin-Chou Liu, Taipei County (TW)

(73) Assignee: MediaTek Inc. (TW)

( * ) Notice: Subject to any disclaimer, the term of this patent is extended or adjusted under 35 U.S.C. 154(b) by 283 days.

(21) Appl. No.: 11/383,752

(22) Filed: May 16, 2006

(65) Prior Publication Data

US 2007/0070762 A1      Mar. 29, 2007

Related U.S. Application Data

(60) Provisional application No. 60/596,275, filed on Sep. 13, 2005.

(51) Int. Cl.
*G06F 3/00* (2006.01)
*G06F 13/36* (2006.01)

(52) U.S. Cl. .............. 710/52; 710/310; 365/189.05

(58) Field of Classification Search ............ 365/189.05; 710/52–57, 33–35, 310
See application file for complete search history.

(56) References Cited

U.S. PATENT DOCUMENTS

| | | | |
|---|---|---|---|
| 6,243,769 B1 * | 6/2001 | Rooney | 710/56 |
| 6,704,672 B2 | 3/2004 | Weickert et al. | |
| 7,003,597 B2 * | 2/2006 | Georgiou et al. | 710/56 |
| 2005/0027874 A1 * | 2/2005 | Kim et al. | 709/230 |
| 2006/0161698 A1 * | 7/2006 | Shen et al. | 710/52 |

FOREIGN PATENT DOCUMENTS

| | | |
|---|---|---|
| EP | 0 429 139 A1 | 5/1991 |
| EP | 1 158 515 A2 | 11/2001 |

OTHER PUBLICATIONS

Adrian Als:"Shift Registers", Internet Article, [Online], Apr. 12, 2000, Retrieved from the Internet: URL:http://scitec.uwichill.edu.bb/cmp/online/P10F/shift.htm.

* cited by examiner

*Primary Examiner*—Christopher B Shin
(74) *Attorney, Agent, or Firm*—Winston Hsu

(57) ABSTRACT

A method for storing data in a first buffer and a second buffer is disclosed. The method includes: sequentially storing an incoming data into the first buffer and the second buffer according to a first threshold; transferring data stored in the second buffer to the first buffer when an amount of data stored in the second buffer reaches a second threshold; and driving the first buffer to output data stored therein when an amount of data stored in the first buffer exceeds the first threshold after transferred data is received from the second buffer.

28 Claims, 7 Drawing Sheets

METHOD AND APPARATUS FOR OPTIMIZING DATA BUFFERING

CROSS REFERENCE TO RELATED APPLICATIONS

This application claims the benefit of U.S. Provisional Application No. 60/596,275, which was filed on Sep. 13, 2005 and is included herein by reference.

BACKGROUND

Small, light, high-density, and low-cost optical disks have become one of the most popular non-volatile forms of storage media. Optical disk drives capable of recording at high-speed are required for mass data storing. Buffer under run becomes a critical problem, however. Buffer under-run occurs when the data source cannot offer the compatible data throughput in order to feed the optical disk drive to record an optical disk at a high speed.

Taking a digital video recorder (DVR) for example, when the DVR records image data onto the optical disk, speed of data recording is constant, and faster than the speed of data producing. Because of this, when the buffer becomes empty after a DVD recorder writes all buffered data onto a disc, the DVD recorder will start a linking process to record the following produced data stored into the buffer. In the process of data burning, fewer linking processes can achieve a better recording quality. Therefore, a novel method is needed to reduce the number of linking processes in order to optimize the data recording performance.

SUMMARY

It is therefore one of the objectives of the claimed disclosure to provide a method and apparatus for optimizing data buffering by transferring data stored in a second buffer to a first buffer and driving the first buffer to output data stored therein when an amount of buffered data stored in the first buffer and the second buffer reaches a specific threshold, in order to solve the above-mentioned problem.

According to one embodiment of the claimed disclosure, a method for storing data in a first buffer and a second buffer is disclosed. The method comprises: sequentially storing an incoming data into the first buffer and the second buffer according to a first threshold; transferring data stored in the second buffer to the first buffer when an amount of data stored in the second buffer reaches a second threshold; and driving the first buffer to output data stored therein when an amount of data stored in the first buffer exceeds the first threshold after transferred data is received from the second buffer.

According to another embodiment of the claimed disclosure, an apparatus for storing data in a first buffer and a second buffer is disclosed. The apparatus comprises: a data storing control unit, coupled to the first buffer and the second buffer, for controlling storing an incoming data into the first buffer and the second buffer according to a first threshold; and a data transferring control unit, coupled to the first buffer and the second buffer, for controlling transferring data stored in the second buffer to the first buffer, and driving the first buffer to output data stored therein when an amount of data stored in the first buffer exceeds the first threshold after transferred data is received from the second buffer.

According to another embodiment of the claimed disclosure, a system with data buffering is disclosed. The system comprises: a first buffer; a second buffer; a multimedia data generating apparatus, for generating an incoming data; a data buffer controlling apparatus, coupled to the multimedia data generating apparatus, the data buffer controlling apparatus comprising: a data storing control unit, coupled to the first buffer and the second buffer, for controlling the incoming data storing into the first buffer and the second buffer; and a data transferring control unit, coupled to the first buffer and the second buffer, for controlling transferring data stored in the second buffer to the first buffer, and driving the first buffer to output data stored therein when the an amount of data stored in the first buffer exceeds the first threshold after transferred data is received from the second buffer; and an optical storage apparatus, coupled to the first buffer, for recording data outputted from the first buffer to an optical disc.

According to another embodiment of the claimed disclosure, a method for storing data in a first buffer and a second buffer, the method comprises: sequentially storing an incoming data into the first buffer and the second buffer; and when a total amount of data stored in the first buffer and the second buffer reaches a specific threshold, transferring data stored in the second buffer to the first buffer, and driving the first buffer to output data stored therein.

According to another embodiment of the claimed disclosure, an apparatus for storing data in a first buffer and a second buffer is disclosed. The apparatus comprises: a data storing control unit, coupled to the first buffer and the second buffer, for controlling storing an incoming data into the first buffer and the second buffer; and a data transferring control unit, coupled to the first buffer and the second buffer, for controlling transferring data stored in the second buffer to the first buffer, and driving the first buffer to output data stored therein when a total amount of buffered data stored in the first buffer and the second buffer reaches a specific threshold.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
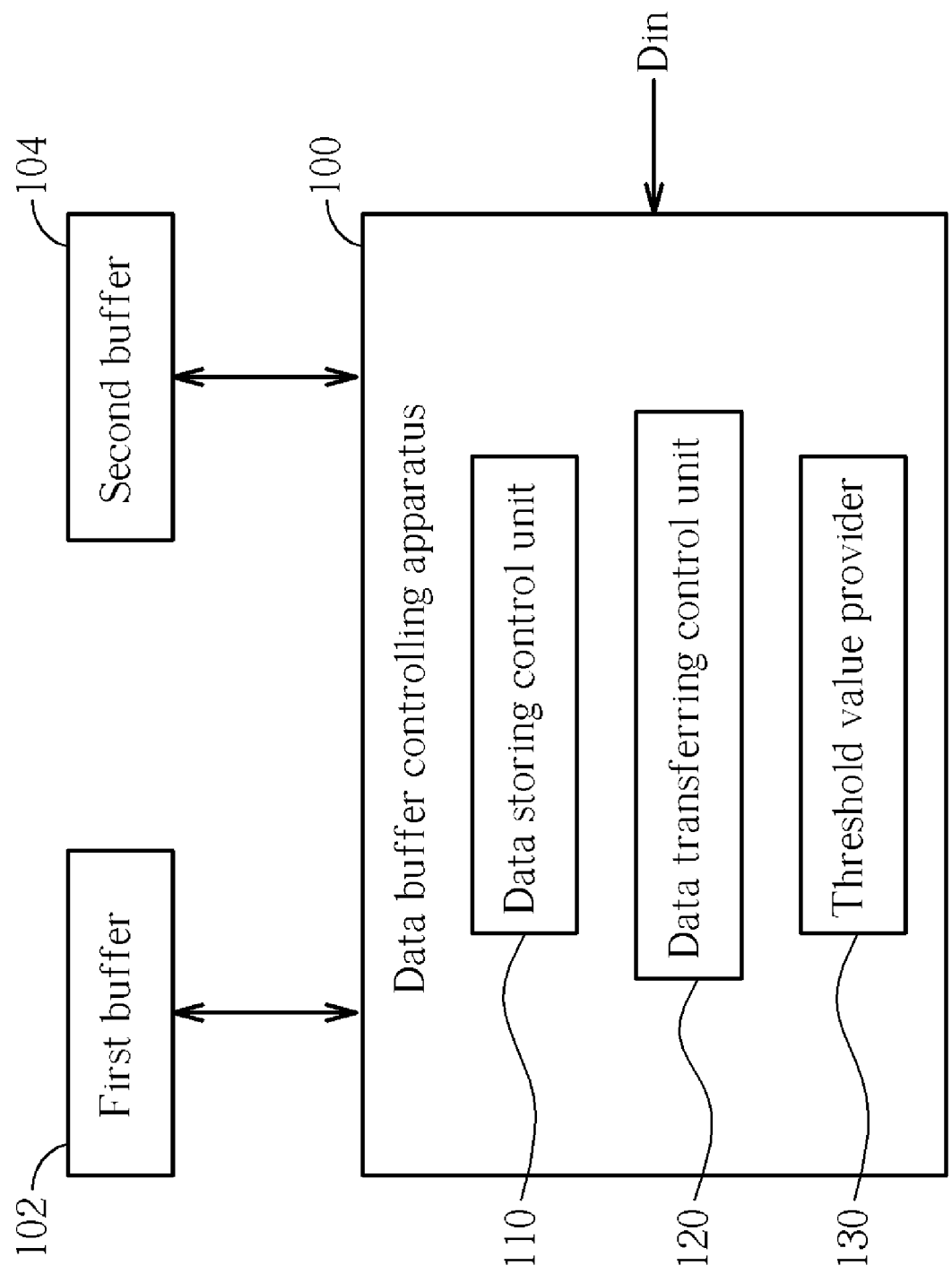
FIG. 1 is a block diagram of a data buffer controlling apparatus for storing data in a first buffer and a second buffer according to a first embodiment of the present disclosure.

Please refer to FIG. 1. FIG. 1 is a block diagram of a data buffer controlling apparatus 100 for storing data in a first buffer 102 and a second buffer 104 according to one embodiment of the present disclosure. The data buffer controlling apparatus 100 includes a data storing control unit 110, a data transferring control unit 120, and a threshold value provider 130. The threshold value provider 130 is utilized for providing a first threshold to the first buffer 102 and a second threshold to the second buffer 104. The data storing control unit 110 is utilized for sequentially storing an incoming data $D_{in}$ into the first buffer 102 and the second buffer 104. In this embodiment, the data storing control unit 110 first stores the incoming data $D_{in}$ into the first buffer 102 until an amount of data stored in the first buffer 102 reaches the first threshold, and then directs the received incoming data Din to the second buffer 104. When an amount of buffered data stored in the first buffer and the second buffer reaches a specific threshold, that is, when both first and second thresholds are met, the data transferring control unit 120 is activated to transfer data stored in the second buffer 104 to the first buffer 102 and drive the first buffer 102 to output data stored therein. In this way, the data buffering performance is optimized. Please note that a data outputting speed of the first buffer 102 is different from a data incoming speed of the second buffer 104.

Figure 2:
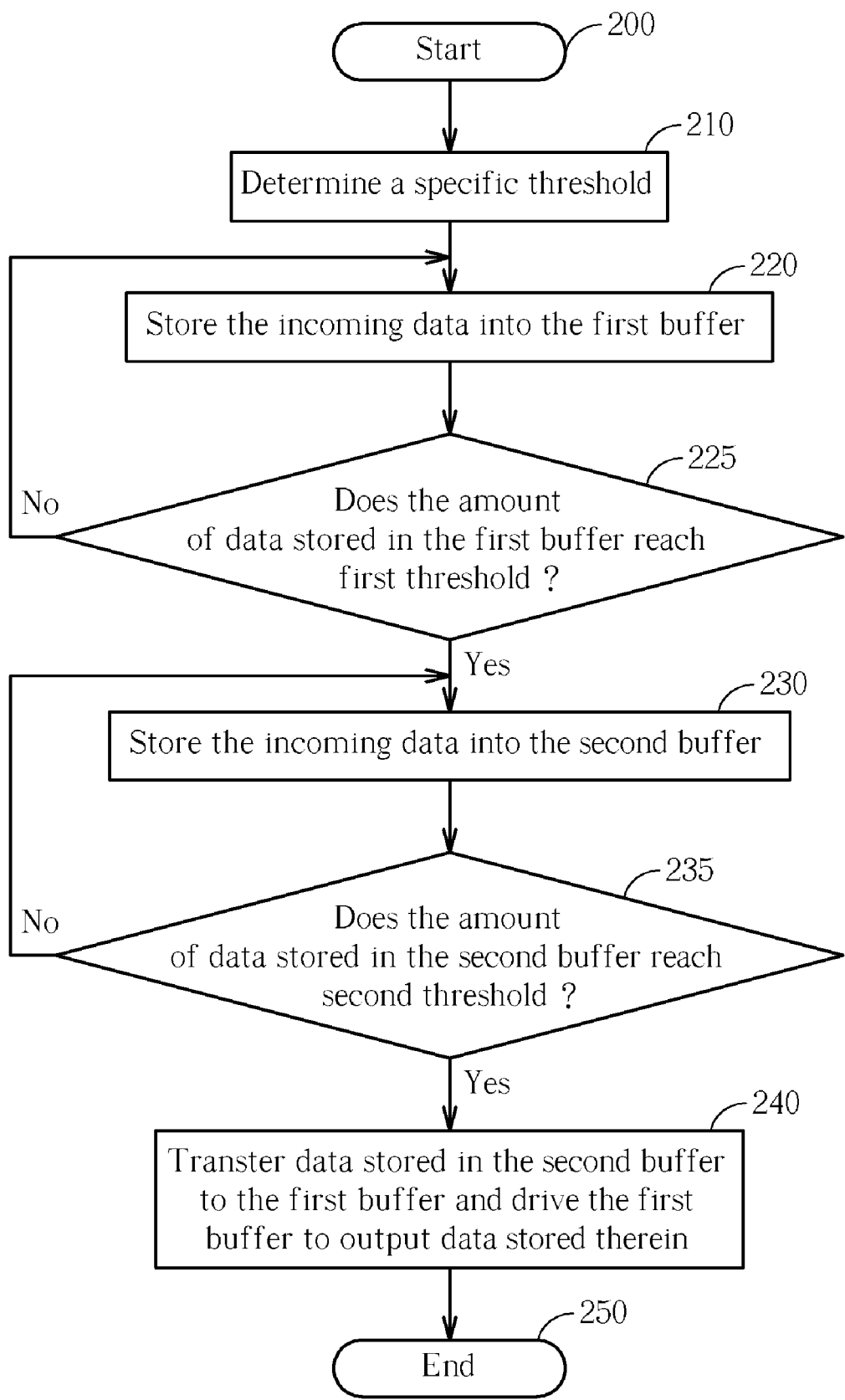
FIG. 2 is a flowchart of a method employed by the data buffer controlling apparatus for storing data in the first buffer and the second buffer.

Please refer to FIG. 2 in conjunction with FIG. 1. FIG. 2 is a flowchart of one method employed by the data buffer controlling apparatus 100 for storing data in the first buffer 102 and the second buffer 104. The data buffering method is summarized as follows:

Step 200: Start.

Step 210: Determine a specific threshold. The threshold value provider 130 provides a first threshold to the first buffer 102 and a second threshold to the second buffer 104.

Step 220: Store the incoming data into the first buffer 102. The data storing control unit 110 first stores the incoming data $D_{in}$ into the first buffer 102.

Step 225: Does the amount of data stored in the first buffer 102 reach the first threshold? If yes, go to step 230; otherwise, go to step 220 to continue data buffering in the first buffer 102.

Step 230: Store the incoming data into the second buffer 104. The data storing control unit 110 now stores incoming data into the second buffer 104 instead of the first buffer 102.

Step 235: Does the amount of data stored in the second buffer 104 reach the second threshold? If yes, go to step 240; otherwise, go to step 230 to continue data buffering in the second buffer 104.

Step 240: Transfer data stored in the second buffer 104 to the first buffer 102 and drive the first buffer 102 to output data stored therein. This process is controlled by the data transferring control unit 120.

Step 250: Finish.

The data storing control unit 110 stores received incoming data $D_{in}$ in both first and second buffers 102 and 104, and the data transferring control unit 120 activates data transfer of the first and second buffers 102 and 104 only when the amount of data stored in both the first and second buffers 102, 104 reaches the specific threshold defined by the aforementioned first and second thresholds.

Figure 2A:
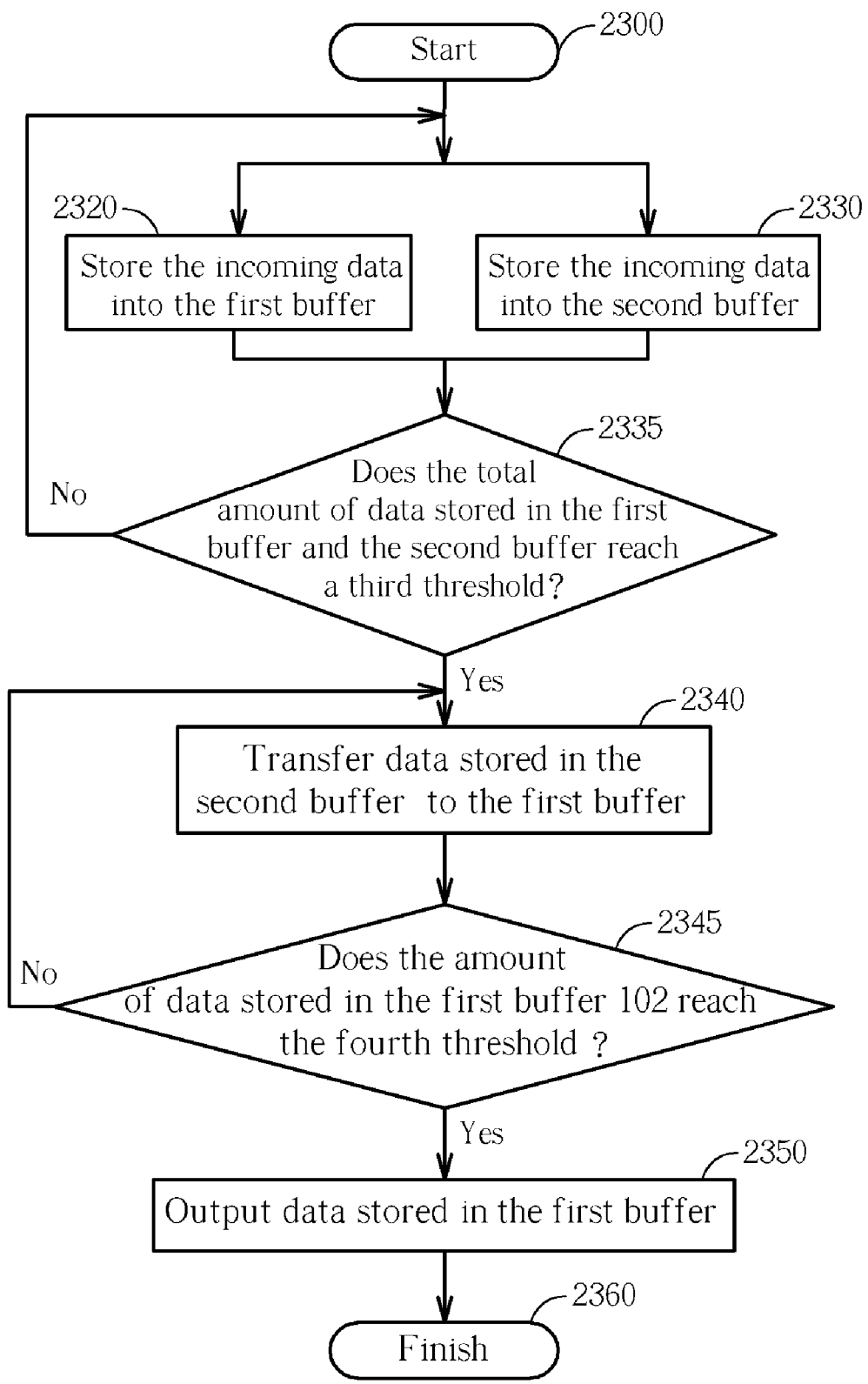
FIG. 2a is a flowchart of a method employed by the data buffer controlling apparatus for storing data in the first buffer and the second buffer.

Please refer to FIG. 2a in conjunction with FIG. 1. FIG. 2a is a flowchart of another method employed by the data buffer controlling apparatus 100 for storing data in the first buffer 102 and the second buffer 104. The data buffering method is summarized as follows:

Step 2300: Start.

Step 2320: Store the incoming data into the first buffer 102. The data storing control unit 110 first stores the incoming data Din into the first buffer 102.

Step 2330: Store the incoming data into the second buffer 104. The data storing control unit 110 stores incoming data into the second buffer 104.

Step 2335: Does the total amount of data stored in the first buffer and the second buffer reach a third threshold? If yes, go to step 2340; otherwise, go to step 2320 or step 2330 to continue data buffering in the first buffer 102 or the second buffer 104.

Step 2340: Transfer data stored in the second buffer 104 to the first buffer 102. The data transferring control unit 120 transfers data stored in the second buffer 104 to the first buffer 102.

Step 2345: Does the amount of data stored in the first buffer 102 reach the fourth threshold? If yes, go to step 2350; otherwise, go to step 2340 to continue data buffering in the first buffer 102.

Step 2350: output data stored in the first buffer. The first buffer 102 outputs data stored therein.

Step 2360: Finish.

The data storing control unit 110 stores received incoming data Din in both first and second buffers 102 and 104, and the data transferring control unit 120 activates data transfer of the first and second buffers 102 and 104 only when the total amount of data stored in the first buffer 102 and the second buffers 104 reaches the third threshold. Please note that if the amount of data stored in the first buffer 102 does not reach the fourth threshold after the total amount of data stored in the first buffer 102 and the second buffers 104 reaches the third threshold, the data stored in the first buffer 102 will not be outputted. In this case, the data transferring control unit 120 transfers data stored in the second buffer 104 to the first buffer 102 until the amount of data stored in the first buffer 102 reaches the fourth threshold and then drives the first buffer 102 to output data stored therein.

As disclosed above, because both first and second buffers 102, 104 are utilized for buffering data before data stored in the first buffer 102 are transferred out, the data buffering performance is improved. Furthermore, the data buffer controlling apparatus 100 shown in FIG. 1 can be applied to any devices requiring data buffering functionality. For example, a digital video recorder (DVR) can utilized the disclosed data buffer controlling apparatus to improve its data recording performance.

Figure 3:
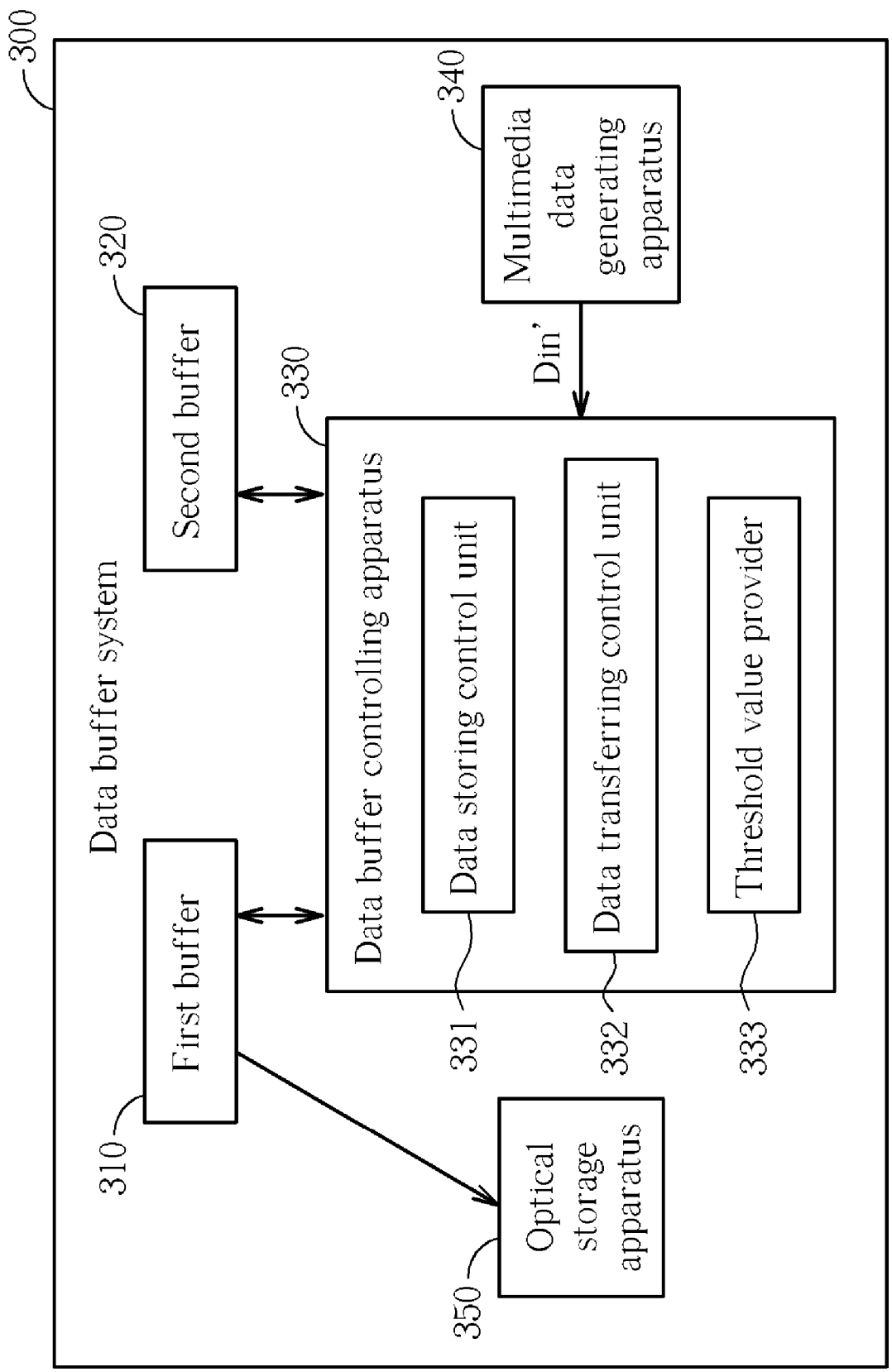
FIG. 3 is a block diagram of a data buffering system according to a second embodiment of the present disclosure.

Please refer to FIG. 3. FIG. 3 is a block diagram of a data buffering system 300 according to an embodiment of the present disclosure. The data buffer system 300 adopts the above data buffer controlling apparatus 100 shown in FIG. 1, and benefits from the improved data buffering performance. As shown in FIG. 3, the data buffer system 300 includes a first buffer 310, a second buffer 320, a data buffer controlling apparatus 330, a multimedia data generating apparatus 340 and an optical storage apparatus 350. In addition, the data buffer controlling apparatus 330 includes a data storing control unit 331, a data transferring control unit 332, and a threshold value provider 333. The threshold value provider 333 provides a first threshold to the first buffer 310 and a second threshold to the second buffer 320. The data storing control unit 331 sequentially stores incoming data $D_{in}'$ into the first buffer 310 and the second buffer 320. In this embodiment, the incoming data Din' is generated from the multimedia data generating apparatus 340. For example, if the multimedia data generating apparatus 340 comprises an image capturing apparatus, the incoming data $D_{in}'$ may include a part of image data; and if the multimedia capturing apparatus 340 comprises a microphone, the incoming data $D_{in}'$ may include a part of audio data. When an amount of buffered data stored in the first buffer 310 and the second buffer 320 reaches a specific threshold, the data transferring control unit 332 is activated to transfer data stored in the second buffer 320 to the first buffer 310 and drive the first buffer 310 to output data stored therein to the optical storage apparatus 350 (e.g. a DVD recorder), where the optical storage apparatus 350 records data outputted from the first buffer 310 to an optical disc. Please note that a data outputting speed of the first buffer 310 is different from a data incoming speed of the second buffer 320.

As shown in FIG. 3, the first buffer 310 and the second buffer 320 are components disposed outside the multimedia capturing apparatus 340 and the optical storage apparatus 350. This is only for illustrative purposes, however. In other embodiments, the first buffer 310 can be integrated in the optical storage apparatus 350, and the second buffer 320 can be integrated in the multimedia capturing apparatus 340. In other words, the data buffer controlling apparatus 330 arbitrates data buffering between the first buffer 310 embedded in the optical storage apparatus 350 and the second buffer 320 embedded in the multimedia capturing apparatus 340 for obtaining optimized data buffering performance. These alternative designs fall in the scope of the present disclosure.

Figure 4:
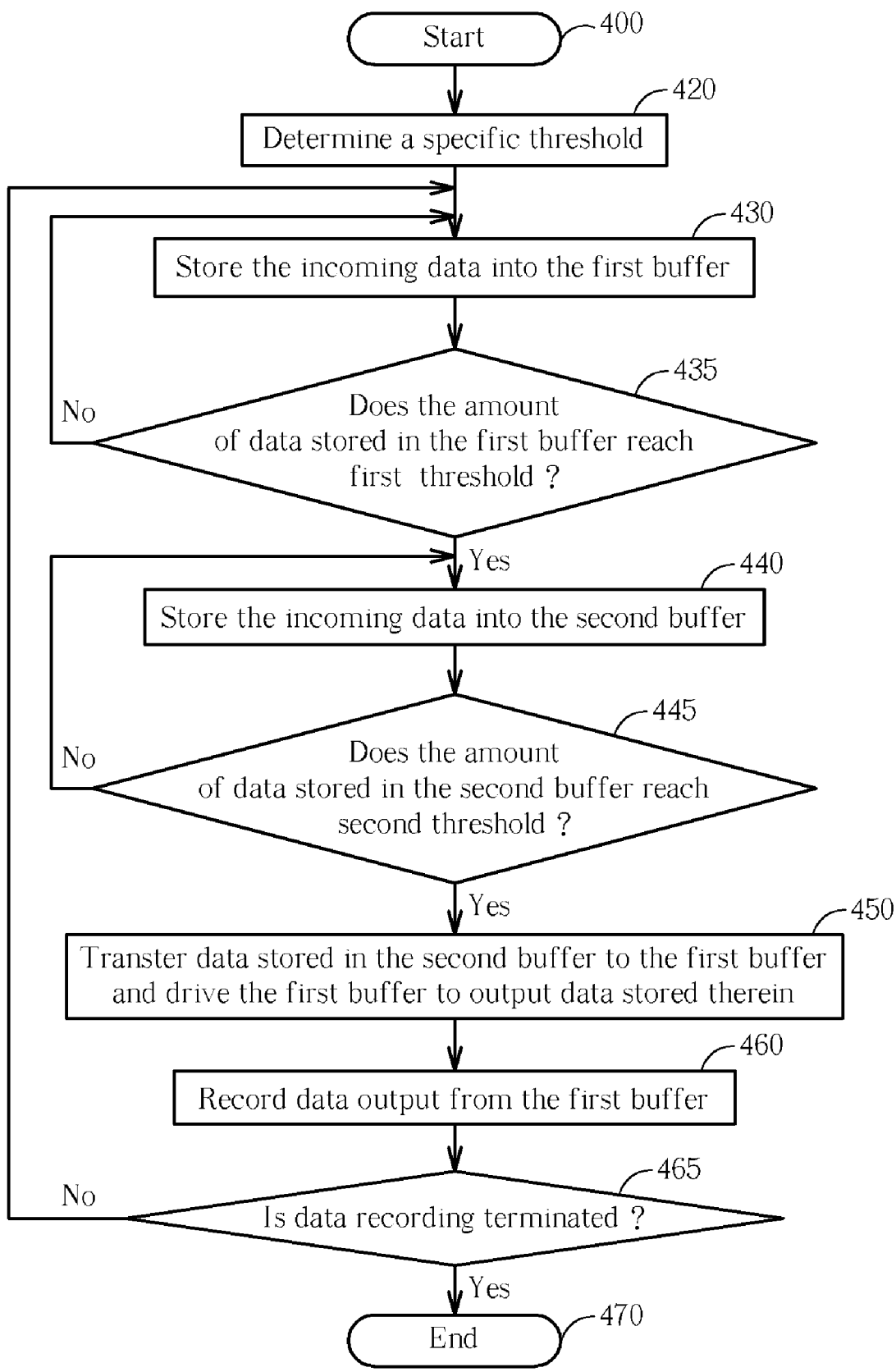
FIG. 4 is a flowchart of a method employed by the data buffering system for storing data in a first buffer and a second buffer.

Please refer to FIG. 4. FIG. 4 is a flowchart of one method employed by the data buffering system 200 for storing data in a first buffer 310 and a second buffer 320. The data buffering method is summarized as follows.

Step 400: Start.

Step 420: Determine a specific threshold. The threshold value provider 333 determines the specific threshold according to quality of images generated by the multimedia data generating apparatus 340 and provides a first threshold to the first buffer 310 and a second threshold to the second buffer 320.

Step 430: Store the incoming data into the first buffer 310. The data storing control unit 331 first stores the incoming data $D_{in}'$ into the first buffer 310.

Step 435: Does the amount of data stored in the first buffer 310 reach the first threshold? If yes, go to step 440; otherwise, go to step 430 to continue data buffering in the first buffer 310.

Step 440: Store the incoming data into the second buffer 320. The data storing control unit 331 stores the incoming data $D_{in}'$ into the second buffer 320 instead of the first buffer 310.

Step 445: Does the amount of data stored in the second buffer 320 reach the second threshold? If yes, go to step 450; otherwise, go to step 440 to continue data buffering in the second buffer 320.

Step 450: Transfer data in the second buffer 320 to the first buffer 310 and drive the first buffer 310 to output data. The data transferring control unit 332 is activated to transfer data stored in the second buffer 320 to the first buffer 310 and drive the first buffer 310 to output data stored therein to the optical storage apparatus 350.

Step 460: Record data outputted from the first buffer 310. The optical storage apparatus 350 records data outputted from the first buffer 310 to an optical disc.

Step 465: Is data recording terminated? If yes, go to step 470; otherwise, go to step 430.

Step 470: Finish.

Figure 4A:
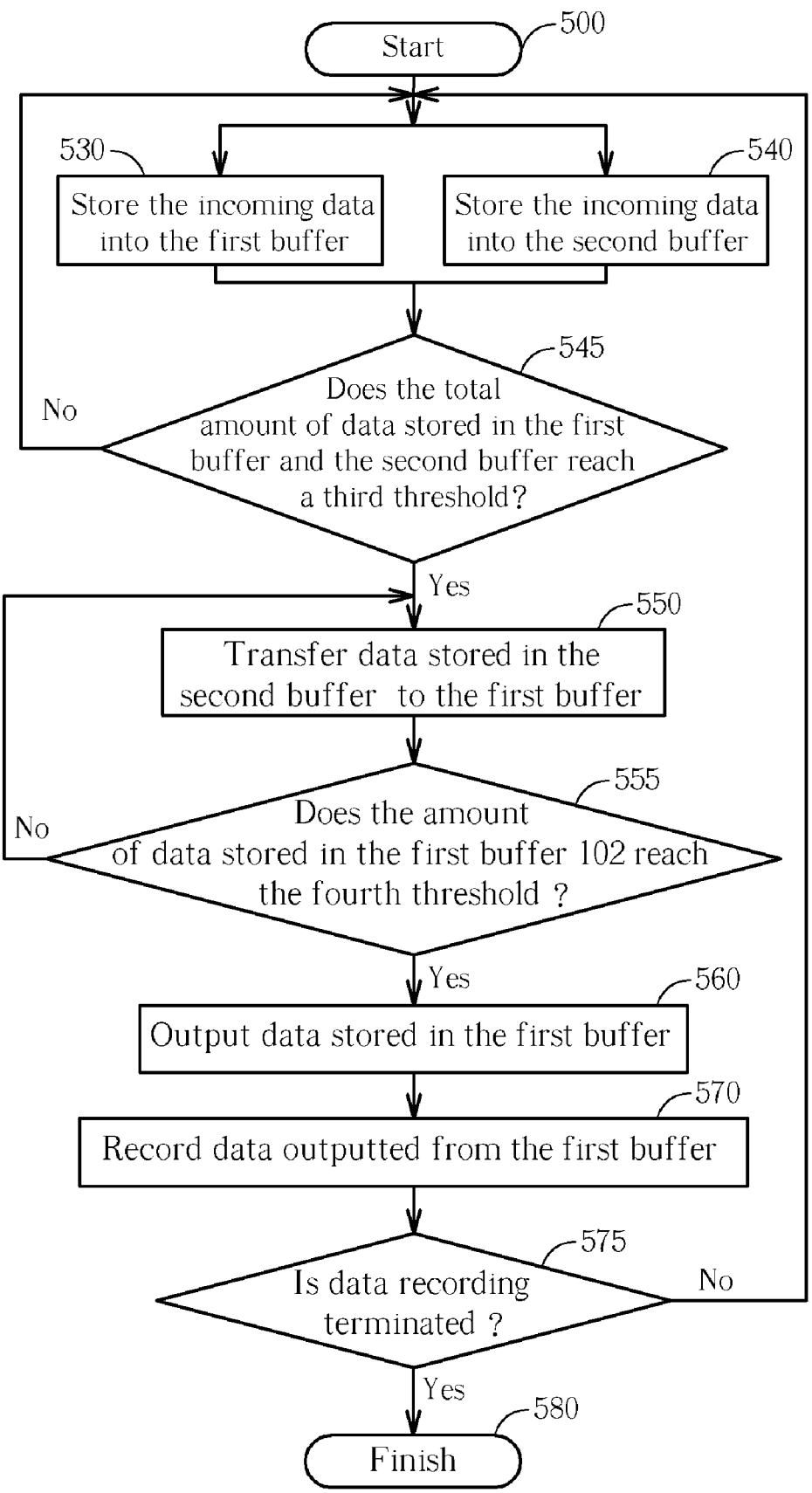
FIG. 4a is a flowchart of a method employed by the data buffering system for storing data in a first buffer and a second buffer.

Please refer to FIG. 4a. FIG. 4a is a flowchart of another method employed by the data buffering system 200 for storing data in a first buffer 310 and a second buffer 320. The data buffering method is summarized as follows.

Step 500: Start.

Step 530: Store the incoming data into the first buffer 310. The data storing control unit 331 first stores the incoming data $D_{in}'$ into the first buffer 310.

Step 540: Store the incoming data into the second buffer 320. The data storing control unit 331 stores the incoming data $D_{in}'$ into the second buffer 320.

Step 545: Does the total amount of data stored in the first buffer and the second buffer reach a third threshold? If yes, go to step 550; otherwise, go to step 530 or step 540 to continue data buffering in the first buffer or the second buffer 320.

Step 550: Transfer data in the second buffer 320 to the first buffer 310. The data transferring control unit 332 is activated to transfer data stored in the second buffer 320 to the first buffer 310.

Step 555: Does the amount of data stored in the first buffer 310 reach the fourth threshold? If yes, go to step 560; otherwise, go to step 550 to continue data buffering in the first buffer 102.

Step 560: output data stored in the first buffer 310. The first buffer 310 output data stored therein.

Step 570: Record data outputted from the first buffer 310. The optical storage apparatus 350 records data outputted from the first buffer 310 to an optical disc.

Step 575: Is data recording terminated? If yes, go to step 580; otherwise, go to step 530 or step 540.

Step 580: Finish.

It should be noted that the data recording speed of the optical storage apparatus 350, as known to those skilled in this art, is far faster than the data producing speed of the multimedia capturing apparatus 340. Therefore, the data recording process of the currently buffered data is finished in a short period of time. In this embodiment, however, as both first and second buffers 310 and 320 are used for buffering data before the optical storage apparatus 350 starts the data recording process, the number of created linking points can be reduced. In short, in the present disclosure, the utilization of the first and second buffers 310, 320 is optimized, resulting in less linking points.

Figure 5:
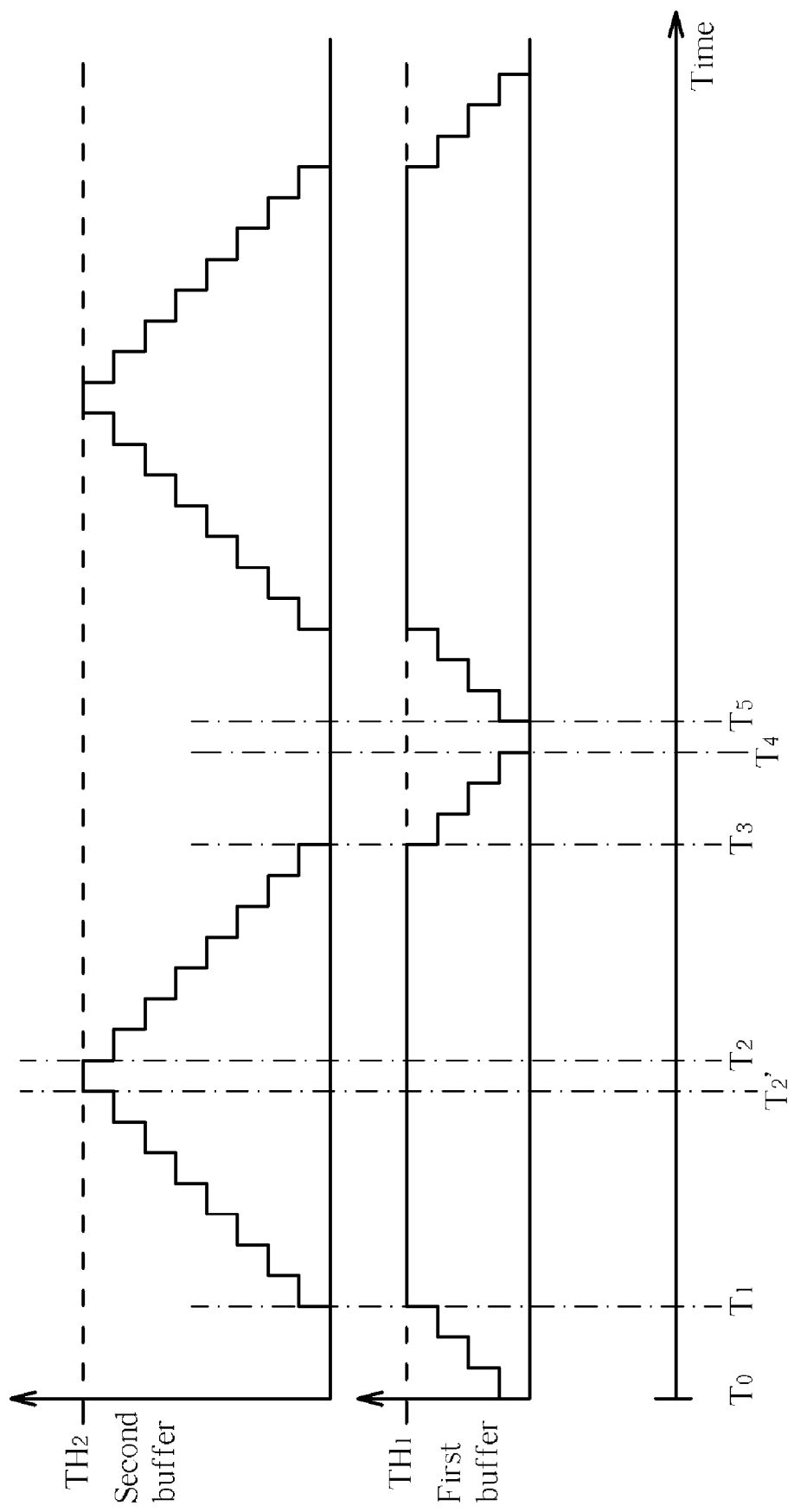
FIG. 5 is a diagram illustrating the data buffering status of the first buffer and the second buffer shown in FIG. 3.

Please refer to FIG. 5. FIG. 5 is a diagram illustrating the data buffering status of the first buffer 310 and the second buffer 320 shown in FIG. 3. The threshold value provider 333 provides a first threshold $TH_1$ and a second threshold $TH_2$ to the first buffer 310 and the second buffer 320 respectively. In the beginning, the multimedia capturing apparatus 340 generates the incoming data Din' at time T0. The data storing control unit 331 then buffers the received incoming data Din' into the first buffer 310. At time $T_1$, the amount of data buffered in the first buffer 310 reaches the first threshold $TH_1$, and the data storing control unit 331 therefore buffers the received incoming data $D_{in}'$ into the second buffer 320. Please note that as the amount of data buffered in the first buffer 310 does not exceed the first threshold $TH_1$ yet, the data transferring control unit 332 is not activated to enable the data write-in. As shown in FIG. 5, the amount of data buffered in the second buffer 320 reaches the second threshold $TH_2$ at time $T_2'$. If the second buffer 320 keeps buffering incoming data $D_{in}'$, however, the amount of data buffered in the second buffer 320 will exceed the second threshold $TH_2$ at time $T_2$, and the data transferring control unit 332 is therefore activated to transfer data stored in the second buffer 320 to the first buffer 310. It is obvious that after receiving the data outputted from the second buffer 320, the amount of data buffered in the first buffer 310 will exceed the first threshold $TH_1$ at time $T_2$ as well. Similarly, the data transferring control unit 332 starts transferring data stored in the first buffer 310 to the optical storage apparatus 350. Therefore, the data recording process begins at time $T_2$, and the optical storage apparatus 350 records data outputted from the first buffer 310 to an optical disc.

As shown in FIG. 5, the second buffer 320 becomes empty at time $T_3$. The amount of data buffered in the first buffer 310 starts decreasing, and becomes empty at time $T_4$. Since no data is buffered in the first buffer 310, the data recording process is interrupted at time $T_4$, and the optical storage apparatus 350 creates a linking point accordingly. As mentioned above, the data recording speed of the optical storage apparatus 350 is far faster than the data producing speed of the multimedia capturing apparatus 340. Therefore, at time $T_5$ the optical storage apparatus 350 stops recording, the multimedia capturing apparatus 340 generates the incoming data $D_{in}'$, and the data storing control unit 331 buffers the received incoming data $D_{in}'$ into the currently empty first buffer 310.

As shown in FIG. 5, the first buffer 310 is filled with data up to the first threshold before the second buffer 320 is filled with data up to the second threshold. The data recording process begins only when both buffers 310, 320 are filled with data up to the respective thresholds. Therefore, the amount of buffered data to be recorded for each data recording session is greater than in the related art, because both first and second buffers 310, 320 are taken into account. The number of linking points can thus be reduced and the overall data recording performance can be greatly improved.

Please note that the quality of multimedia data (HQ, SP, LP, EP, SLP, SEP) determines the speed of data producing. That is, the incoming data rate for the second buffer 320 depends on the quality of multimedia data adopted by the multimedia capturing apparatus 340. As the speed of data producing decreases, the reserved buffering space for error handling can be reduced. The first threshold and the second threshold can be set by greater values, further reducing the number of linking points. Therefore, the threshold value provider can program the required buffer threshold according to the quality of multimedia data (HQ, SP, LP, EP, SLP, SEP) adopted by the multimedia capturing apparatus, thereby achieving optimum performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for storing data in a first buffer and a second buffer, the method comprising:
    sequentially storing an incoming data into the first buffer and the second buffer according to a first threshold;
    transferring data stored in the second buffer to the first buffer when an amount of data stored in the second buffer reaches a second threshold; and
    when an amount of data stored in the first buffer exceeds the first threshold after transferred data is received from the second buffer, driving the first buffer to output data stored therein.

2. The method of claim 1, further comprising:
    providing the first threshold;
    wherein the step of sequentially storing an incoming data into the first buffer and the second buffer according to a first threshold further comprises:
    storing the incoming data into the first buffer until an amount of data stored in the first buffer reaches the first threshold; and
    storing the incoming data into the second buffer after an amount of data stored in the first buffer reaches the first threshold.

3. The method of claim 2, further comprising:
    providing the second threshold referring to the first threshold;
    wherein the step of transferring data stored in the second buffer to the first buffer is performed when an amount of data stored in the second buffer reaches the second threshold.

4. The method of claim 1, wherein the incoming data is multimedia data.

5. The method of claim 4, further comprising:
    determining the first threshold and the second threshold according to the quality of multimedia data.

6. The method of claim 1, wherein the first buffer outputs data therein to an optical storage apparatus.

7. The method of claim 6, wherein a speed of data outputting of the first buffer is different from a speed of data incoming of the second buffer.

8. An apparatus for storing data in a first buffer and a second buffer, the apparatus comprising:
    a data storing control unit, coupled to the first buffer and the second buffer, for controlling storing an incoming data into the first buffer and the second buffer according to a first threshold; and
    a data transferring control unit, coupled to the first buffer and the second buffer, for controlling transferring data stored in the second buffer to the first buffer, and driving the first buffer to output data stored therein when an amount of data stored in the first buffer exceeds the first threshold after transferred data is received from the second buffer.

9. The apparatus of claim 8, further comprising:
    a threshold value provider, for providing a first threshold;
    wherein the data storing control unit controls the incoming data to be stored into the first buffer until an amount of data stored in the first buffer reaches the first threshold; and stores the incoming data into the second buffer after an amount of data stored in the first buffer reaches the first threshold.

10. The apparatus of claim 9, wherein the threshold value provider further provides a second threshold and the data transferring control unit controls data transferring from the second buffer to the first buffer and drives the first buffer to output data stored therein when an amount of data stored in the second buffer reaches the second threshold.

11. The apparatus of claim 8, wherein the incoming data is multimedia data.

12. The apparatus of claim 11, further comprising:
    a threshold value provider, for determining the first threshold and the second threshold according to the quality of multimedia data.

13. The apparatus of claim 8, wherein the first buffer outputs data therein to an optical storage apparatus.

14. The apparatus of claim 13, wherein a speed of data outputting of the first buffer is different from a speed of data incoming of the second buffer.

15. A system, comprising:
    a first buffer;
    a second buffer;
    a multimedia data generating apparatus, for generating an incoming data;
    a data buffer controlling apparatus, coupled to the multimedia data generating apparatus, the data buffer controlling apparatus comprising:
        a data storing control unit, coupled to the first buffer and the second buffer, for controlling the incoming data to be stored into the first buffer and the second buffer; and
        a data transferring control unit, coupled to the first buffer and the second buffer, for controlling transferring data stored in the second buffer to the first buffer, and driving the first buffer to output data stored therein when an amount of data stored in the first buffer exceeds the first threshold after transferred data is received from the second buffer; and an optical storage apparatus, coupled to the first buffer, for recording data outputted from the first buffer to an optical disc.

16. The system of claim 15, further comprising:
a threshold value provider, for providing a first threshold;
wherein the data storing control unit controls the incoming data to be stored into the first buffer until an amount of data stored in the first buffer reaches the first threshold; and stores the incoming data into the second buffer after an amount of data stored in the first buffer reaches the first threshold.

17. The apparatus of claim 16, wherein the threshold value provider further provides a second threshold and the data transferring control unit controls data transferring from the second buffer to the first buffer and drives the first buffer to output data stored therein when an amount of data stored in the second buffer reaches the second threshold.

18. The system of claim 15, further comprising:
a threshold value provider, for determining the first threshold and the second threshold according to the quality of multimedia data.

19. The system of claim 15, where a speed of data outputting of the first buffer is different from a speed of data incoming of the second buffer.

20. The system of claim 15, wherein the first buffer is integrated in the optical storage apparatus and the second buffer is integrated in the multimedia data generating apparatus.

21. The system of claim 15, wherein the optical storage apparatus is a DVD recorder.

22. A method for storing data in a first buffer and a second buffer, the method comprising:
sequentially storing an incoming data into the first buffer and the second buffer; and
when a total amount of data stored in the first buffer and the second buffer reaches a specific threshold, transferring data stored in the second buffer to the first buffer, and driving the first buffer to output data stored therein.

23. The method of claim 22, further comprising:
providing a first threshold;
wherein the step of sequentially storing the input data into the first buffer and the second buffer further comprises:
storing the input data into the first buffer until an amount of data stored in the first buffer reaches the first threshold; and
when the first threshold is reached, storing the input data into the second buffer.

24. The method of claim 23, further comprising:
providing a second threshold to the second buffer, the specific threshold being a sum of the first threshold and the second threshold;
wherein the step of transferring data stored in the second buffer to the first buffer and driving the first buffer to output data stored therein is performed when an amount of data stored in the second buffer reaches the second threshold.

25. An apparatus for storing data in a first buffer and a second buffer, the apparatus comprising:
a data storing control unit, coupled to the first buffer and the second buffer, for controlling storing an incoming data into the first buffer and the second buffer; and
a data transferring control unit, coupled to the first buffer and the second buffer, for controlling transferring data stored in the second buffer to the first buffer, and driving the first buffer to output data stored therein when a total amount of buffered data stored in the first buffer and the second buffer reaches a specific threshold.

26. The apparatus of claim 25, further comprising:
a threshold value provider, for providing a first threshold;
wherein the data storing control unit controls the incoming data to be stored into the first buffer until an amount of data stored in the first buffer reaches the first threshold; and stores the incoming data into the second buffer when the first threshold is reached.

27. The apparatus of claim 26, wherein the threshold value provider further provides a second threshold, the specific threshold is a sum of the first threshold and the second threshold, and the data transferring control unit controls data transferring from the second buffer to the first buffer and drives the first buffer to output data stored therein when an amount of data stored in the second buffer reaches the second threshold.

28. A system with data buffering, comprising:
a first buffer;
a second buffer;
a multimedia data generating apparatus, for generating an incoming data;
a data buffering controlling apparatus, coupled to the multimedia data generating apparatus, the data buffer controlling apparatus comprising:
a data storing control unit, coupled to the first buffer and the second buffer, for controlling the incoming data to be stored into the first buffer and the second buffer; and
a data transferring control unit, coupled to the first buffer and the second buffer, for controlling transferring data stored in the second buffer to the first buffer, and driving the first buffer to output data stored therein when a total amount of buffered data stored in the first buffer and the second buffer reaches a specific threshold; and
an optical storage apparatus, coupled to the first buffer, for recording data outputted from the first buffer to an optical disc.

* * * * *